PHONOGRAPH TONE ARM APPARATUS

Filed June 16, 1964

Inventors:
George E. Owen, Jr.
Clarence F. Race
BY: Mueller & Aichele
Attys

United States Patent Office 3,328,035
Patented June 27, 1967

3,328,035

PHONOGRAPH TONE ARM APPARATUS

George E. Owen, Jr., Melrose Park, and Clarence F. Race, Glen Ellyn, Ill., assignors to Motorola, Inc., Chicago, Ill., a corporation of Illinois Filed June 16, 1964, Ser. No. 375,548
1 Claim. (Cl. 274—23)

This invention relates to phonograph apparatus, and more particularly to an improved construction for the tone arm, operating mechanism, and cartridge head assembly for disc record players.

Disc record players generally include a tone arm with a cartridge head attached to one end thereof. The cartridge head carries a ceramic or magnetic cartridge having a compliant stylus which engages the grooved surface of a disc phonograph record. A highly desirable characteristic of such an assembly is that the various parts thereof, excepting the stylus, exhibit high rigidity or stiffness with respect to one another. Because relative motion can occur between the cartridge head and the arm, and between the cartridge and the cartridge head containing the cartridge, losses may be introduced into the system adversely affecting its efficiency.

Another desirable characteristic of phonograph apparatus of the type described is that stylus load or pressure, that is the force or force per area between the phonograph record surface and the portion of the stylus engaging the surface, be minimal to minimize record wear. Reduction in stylus pressure is accomplished by reducing the mass of the tone arm and cartridge head bearing on the stylus. This can be done when the tone arm is supported intermediate its ends by utilizing a counterweight at the opposite end of the tone arm from the cartridge. Such a counter weight, however, adds to the total mass of the assembly. Thus, when sudden movements of the tone arm occur due to a warped record, groove eccentricity surface scratches, or dust particles clogging the grooves, the inertia of the assembly may be sufficient to cause mistrack or skipping of the stylus between grooves in the record surface. This difficulty may be compounded when the effective mass of the tone arm assembly is further increased by the inertia of a mechanism for automatically raising and lowering the arm.

Accordingly, it is an object of this invention to provide phonograph apparatus of improved construction.

Another object of the invention is to provide phonograph apparatus including a rigid tone arm, cartridge, and cartridge head assembly for minimizing energy losses.

Still another object of the invention is to provide phonograph apparatus including a tone arm, cartridge head, and operating mechanism for the tone arm, which presents a low effective mass to forces applied to the cartridge stylus.

A further object of the invention is to provide an improved construction for a tone arm, cartridge head and cartridge assembly, which facilitates manufacturing due to easy assembly.

A feature of the invention is the provision of a tone arm comprising an elongated hollow tube with pivot means connected to the tube proximate one end thereof and with substantially all of the mass of the tone arm being on the same side of the pivot means.

Another feature of the invention is the provision of a shroud independently pivotal about a substantially horizontal axis for pivoting into engagement with the tone arm and lifting the same.

Another feature is the provision of a cartridge head having an elongated extension inserted in and resiliently held by a tubular tone arm at an unsupported end thereof.

Still another feature of the invention is the provision of a tone arm comprising an elongated hollow tube having an axial notch at one end thereof, and the further provision of a cartridge head having an elongated extension with an axial ridge thereon. The extension is insertable into the tube with the axial ridge mating with the notch to align the cartridge head in relation to the tone arm.

A further feature of the invention is the provision of a two piece cartridge head which is insertable in the tone arm to lock the cartridge securely in the cartridge head. The configuration of the cartridge head eliminates the necessity for screws or similar mounting hardware.

Figures 1, 2, 3, 4, 5:
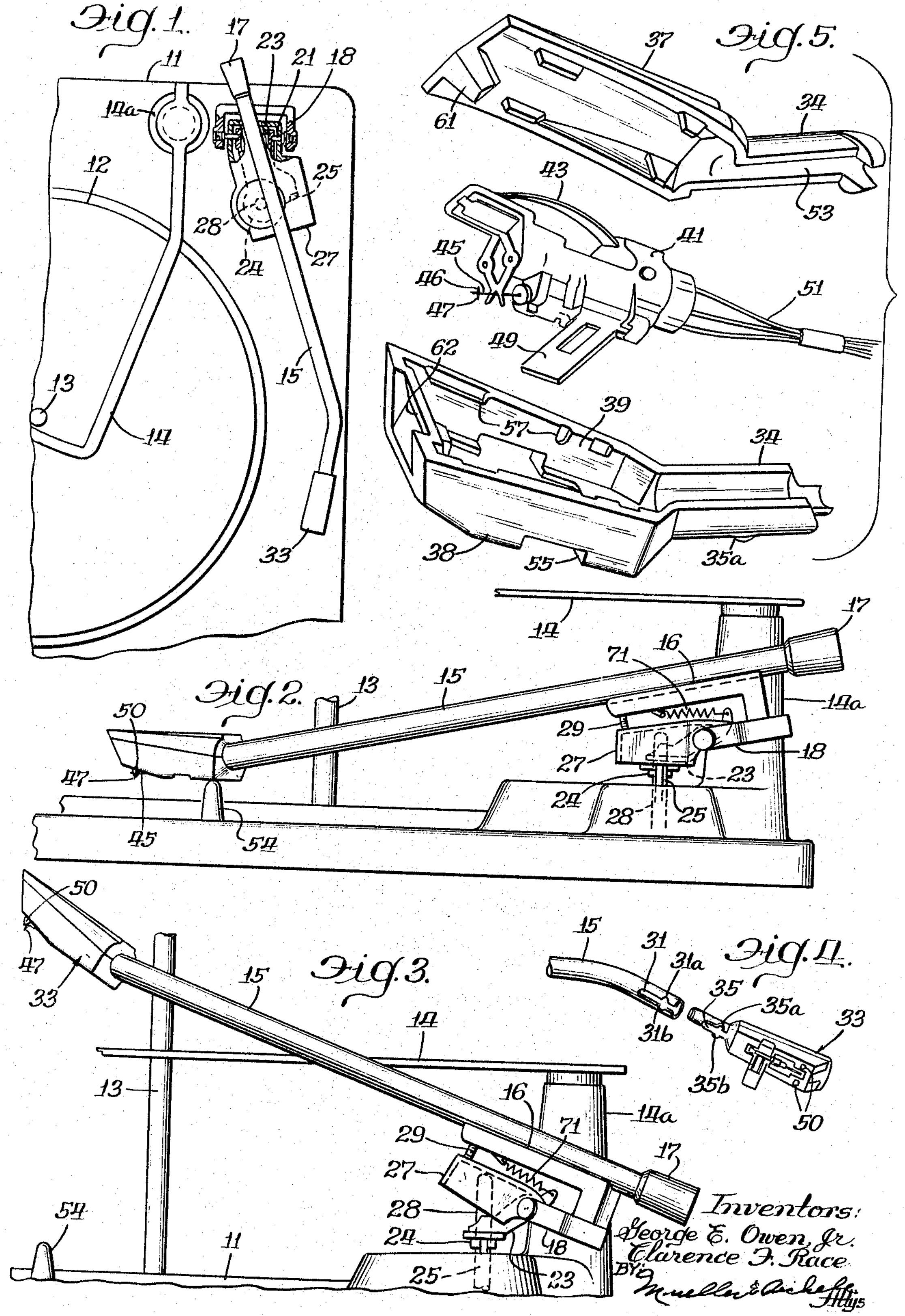
FIG. 1 is a top plan view, partially in section, of a portion of phonograph apparatus constructed in accordance with the invention.
FIG. 2 is an enlarged side elevational view of a portion of the apparatus of FIG. 1.
FIG. 3 is an enlarged side elevational view similar to FIG. 2 with the tone arm and cartridge head raised in response to automatic actuation.
FIG. 4 is an enlarged exploded perspective view of the cartridge head and a portion of the tone arm of FIGS. 1–3; and, FIG. 5 is a further enlarged exploded perspective view of the cartridge and cartridge head.

In accordance with the invention, phonograph apparatus is constructed to include a tone arm comprising an elongated hollow tube. A pivotal support is connected to the tube proximate one end thereof with substantially all of the mass of the tone arm being on one side of the support. A cartridge head for carrying a cartridge is mounted at the unsupported end of the tone arm. This cartridge head includes an elongated extension which is insertable in, and mates with, the tube to form a rigid extension of the tone arm. A slot is provided in the tube and a corresponding ridge in the extension to properly align the cartridge head with the tube. A shroud is also provided for trim covering of the lateral pivot mechanism and in addition for lifting the tone arm in response to automatic actuation. The shroud is mounted to be independently pivotal about a substantially horizontal axis, with the tone arm therefor being separate from the mass of the shroud in vertical displacement.

Referring now more particularly to FIGS. 1, 2 and 3, phonograph apparatus constructed in accordance with the invention is shown. A turntable base 11 carries a turntable 12 thereon having an upwardly extending spindle 13. The phonograph apparatus shown is of the automatic record changer type and includes a spindle guide 14, which extends from post 14*a* and which rests on a stack of disc records mounted on the spindle to maintain them in the proper position for dropping on to the turntable in successive order. Such construction is well known in the art and will not be described in further detail.

A tone arm is comprised of an elongated hollow tube 15 which is rigidly attached to an L-shape support member 16 proximate one end of the tube 15. Substantially all of the mass of the tone arm is to the left (FIGS. 2 and 3) of the downwardly extending part of support member 16. A slight portion of the tone arm extends on the other side of the downwardly extending portion of support member 16 and a decorative element 17, approximating the shape of the frustrum of a cone is mounted thereon. The tone arm including tube 15, element 17, and support member 16, is of light weight construction such as aluminum for maximum rigidity to weight ratio.

Support 16 extends downwardly from tube 15 and terminates in an integral bracket 18 which is of generally U-shaped configuration. A pin 21 extends across bracket 18 (see FIG. 1) and provides pivotal connection on a horizontal axis between bracket 18 and an actuating arm 23. Arm 23 is integral with a collar 24, and a horizontal actuator pin 25 is spaced a given distance from the collar 24. Pin 25 is actuable by a mechanism, as is well known in the art, to place a moment on collar 24, pivoting arm 23 about collar 24 and hence pivoting the tone arm in a horizontal direction across the turntable 12. Pin 25 and arm 23 are also free to pivot with the tone arm, when the mechanism is not actuated, as the tone arm passes over the surface of the record following the grooves therein. Pin 25 is engaged and displaced by the automatic mechanism, not shown, only during the automatic sequences of the phonograph apparatus.

A shroud 27 is also pivotally mounted on pin 21 and is of generally channel-shaped configuration to cover and partially enclose the arm 23 for concealing the arm and the associated elements of the automatic mechanism. Shroud 27 is designed such that its external appearance fits into and blends with the overall design of the phonograph apparatus. A vertical actuator pin 28 extends through collar 24 and is linearly displaceable therein in a vertical direction in response to automatic actuation. When displaced upwardly, pin 28 will strike the inner surface of the top of shroud 27, displacing the shroud upwardly into engagement with a downwardly extending adjustable screw 29 on support member 16. As may be seen from FIGURES 2 and 3, upward displacement of pin 28 displaces shroud 27 upwardly, raising the tone arm. Screw 29 may be used to adjust the lift of the tone arm to precise levels. Thus pins 25 and 28 are responsive to the automatic mechanism of the apparatus, not shown, to displace the tone arm in the horizontal and vertical directions, respectively, for automatic operation of the apparatus.

Referring now to FIG. 4, it will be seen that the opposite end of the tone arm from support member 16 contains an axially extending notch 31 formed therein. Notch 31 is slightly tapered and contains a pair of widened portions **31*a* and 31*b* on either side thereof. A cartridge head 33 is provided for carrying a magnetic or ceramic cartridge or similar pick-up device. Cartridge head 33 includes an extension 34 having an elongated ridge 35 with a pair of protuberances 35*a* and 35*b* on either side thereof. Extension 34 is insertable into the tube 15 with ridge 35 mating in notch 31 to align the cartridge head 33 properly with respect to the tube 15. Notch 31 is tapered and provides a resilient grip by the tube on extension 34. Protuberances 35*a* and 35*b* snap into notches 31*a* and 31*b* to provide further securing of the cartridge head 33 in the tube 15**. The mating dimensions of the described elements, plus the torsion spring action of the slotted open end of the tube resulting from the forced spreading of the single slot, form a complete locking arrangement for securing the cartridge head as a rigid extension of the tone arm, minimizing relative movement therebetween.

Cartridge head 33 is comprised of two sections, an upper section 37 and a lower section 38. The interior of cartridge head 33 contains a chamber 39 for accommodating the cartridge 41. Cartridge 41 has a leaf spring 43 at the top thereof bowed slightly outwardly, and has a stylus 45 having a pair of tips 46 and 47 for playing back from 78 r.p.m. and 33⅓ r.p.m. recorder discs, respectively. An arm 49 permits stylus 45 to be revolved for selective use of tips 46 and 47. Two projections or nubs 50 extend from lower section 38 of cartridge head 33 on either side of stylus 45. Stylus 45 is sufficiently compliant (because the lightness of the tone arm so permits) so that nubs 50 will engage the surface of a record before the force between the stylus and the record exceeds dangerous levels. The arm may then ride over the record surface without the stylus damaging the record or being damaged itself. A plurality of electrical leads 51 extends from cartridge 41 to the hollow interior 53 of extension 34 and into the hollow interior of tube 15. During non-use, the cartridge head rests on stop 54.

Lower section 38 of cartridge 33 has an opening 55 through which the lower portion of cartridge 41 protrudes. The chamber 39 of cartridge 33 contains a plurality of projections to mate with the outer configuration of cartridge 41 and secure the cartridge therein against vibration. The front of top section 37 of cartridge 33 has an inwardly angled projection 61 thereon which mates with a recess 62 formed in the forward end of lower section 38, securing the two sections together at the front end. The top section 37 fits against the lower section 38, pressing down against leaf spring 43 so that cartridge 41 is resiliently but firmly clamped in place when the extension 34 is inserted in the tube 15.

The foregoing described construction provides numerous advantages, among them being a substantial reduction in losses due to relative motion between cartridge and cartridge head, and between the cartridge head and the tube. This is because of the improved construction in the securing of the cartridge in the head and the improved means of securing the cartridge head to the tube. It should also be noted that such a construction permits the securing of the cartridge in position in the head, and maintains head size at a minimum. Mounting hardware, such as screws, clips, etc., are not required in securing the cartridge in the cartridge head reducing cost and facilitating assembly. The light tubular portion of the tone arm is a further minimization of overall effective mass of the system for reducing stylus load. The tone arm is entirely independent in vertical movement from the shroud 27, further reducing the effective mass of the system on the stylus. To obtain the exact stylus pressure necessary, a coil spring 71 is connected from a projection on arm 23 to the underside of support member 16. The tension placed upon spring 71 may be varied according to the stylus pressure desired. Warped records or groove eccentricity and foreign particles in the grooves will be less likely to cause the stylus to skip or mistrack because of this lower effective mass.

The lower limit of the effective mass of the system is governed by the tone arm resonance frequency. This occurs at a point near the lower audio limit where the stylus no longer moves in relation to the arm. Of course, the stylus might be made more compliant to permit further reduction of this effective mass, however, in such circumstances the stylus may deflect too far so that the nubs on the cartridge strike the surface of the record.

From the foregoing discussion it will be seen that the invention provides improved phonograph apparatus having a rigid tone arm, cartridge, and cartridge head assembly, and wherein the effective mass of the assembly is maintained at a minimum. Assembly is facilitated by improved configuration of the elements, and the need for mounting hardware, such as nuts and bolts, is eliminated to reduce cost.

What is claimed is:

A phonograph apparatus including in combination, a tone arm comprising an elongated hollow tube, support means rigidly connected to said tube proximate one end thereof extending outwardly therefrom, pivot means joined to said support means externally of said tube to permit said arm to pivot in a vertical plane, a cartridge head for carrying a cartridge, said cartridge head being mounted on said tube at the end thereof opposite said one end, a shroud pivotally joined to said pivot means and movable independently of said arm in a vertical plane, and an automatic mechanism for pivoting said shroud into engagement with said arm for pivoting said arm to raise said cartridge head, whereby said tone arm and cartridge head form a rigid, low mass assembly of which the inertia of said shroud and automatic mechanism is independent.

References Cited

UNITED STATES PATENTS

| | | | |
|---|---|---|---|
| 2,376,741 | 5/1945 | Weaver | 274—15 |
| 2,446,324 | 8/1948 | Ghilini | 274—23 |
| 2,631,857 | 3/1953 | Bauer | 274—23 |
| 3,096,094 | 7/1963 | Churchill et al. | 274—15 X |

NORTON ANSHER, *Primary Examiner.*

C. B. PRICE, J. F. PETERS, *Assistant Examiners.*